(12) United States Patent
Smith et al.

(10) Patent No.: US 9,360,112 B2
(45) Date of Patent: *Jun. 7, 2016

(54) ASSEMBLY FOR SEALING A SLIDING INTERFACE

(71) Applicant: Cool Energy, Inc., Boulder, CO (US)

(72) Inventors: Lee S. Smith, Boulder, CO (US); Brian Phillip Nuel, Boulder, CO (US)

(73) Assignee: Cool Energy, Inc., Boulder, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/960,965

(22) Filed: Dec. 7, 2015

(65) Prior Publication Data

US 2016/0091091 A1 Mar. 31, 2016

Related U.S. Application Data

(63) Continuation of application No. 13/312,837, filed on Dec. 6, 2011, now Pat. No. 9,206,900.

(60) Provisional application No. 61/444,653, filed on Feb. 18, 2011.

(51) Int. Cl.
| F16J 9/22 | (2006.01) |
| F16J 9/00 | (2006.01) |
| F16J 9/12 | (2006.01) |
| F16J 9/26 | (2006.01) |

(52) U.S. Cl.
CPC ..... *F16J 9/12* (2013.01); *F16J 9/26* (2013.01)

(58) Field of Classification Search
USPC ................... 277/422, 434, 447, 448
See application file for complete search history.

(56) References Cited

U.S. PATENT DOCUMENTS

| 2,575,214 A | 11/1951 | Garland |
| 2,719,767 A | 10/1955 | Ernest |
| 2,797,971 A | 7/1957 | Greenough |
| 3,612,545 A | 10/1971 | Storms |
| 4,179,131 A | 12/1979 | Nussbaumer |
| 4,350,082 A | 9/1982 | Carrens |
| 6,428,014 B2 | 8/2002 | Scarlett |

FOREIGN PATENT DOCUMENTS

| DE | 3714400 A1 | 11/1987 |
| EP | 1936244 A1 | 6/2008 |
| GB | 729306 A | 5/1955 |
| GB | 810986 A | 3/1959 |

*Primary Examiner* — Vishal Patel
*Assistant Examiner* — Stacy Warren
(74) *Attorney, Agent, or Firm* — Patterson & Sheridan, L.L.P.

(57) ABSTRACT

An assembly is disclosed for sealing the sliding interface between two objects capable of sliding or moving with respect to one another, but where the sliding interface must provide a substantial seal against pressure loss therethrough, such as where an assembly seals the sliding interface between a piston and a cylinder or between a rod and a bushing. The sliding interface includes a seal located in a seal groove, wherein the seal ring height is less than the height of the seal groove and the inner diameter of the seal is greater than the base of the groove. In one aspect, the difference in height is set by a shim and a piece of material of the same height as that of the seal ring.

16 Claims, 5 Drawing Sheets

ASSEMBLY FOR SEALING A SLIDING INTERFACE

CROSS-REFERENCE TO RELATED APPLICATIONS

This application is a continuation of co-pending U.S. patent application Ser. No. 13/312,837, filed on Dec. 6, 2011, which claims benefit of U.S. provisional patent application Ser. No. 61/444,653, filed on Feb. 18, 2011. Each of the aforementioned related patent applications is herein incorporated by reference.

BACKGROUND OF THE INVENTION

1. Field of the Invention

The present invention relates to the field of sealing of sliding interfaces. More particularly, the present invention relates to the field of sealing of sliding interfaces, such as that existing between a cylinder and a piston reciprocating therein, or between a bushing and a rod reciprocating within an aperture through the bushing, where a difference in pressure exists between or across opposed faces or surfaces of the moving member.

2. Background of the Art

Sliding seal interfaces are used to enable the transfer of energy, such as from combustion or from temperature or pressure changes of a gas or fluid in an enclosed volume, by enabling a member such as a piston to move relative to a cylinder, and thus expand or contract the volume enclosed by the cylinder and piston surfaces in response to such combustion or pressure or temperature changes, and thereby enable the energy, evidenced for example by an increase in fluid pressure in a volume bounded by a piston and a cylinder, to be reduced in that volume by increasing the volume within which the fluid is present, resulting in useful movement of the piston to transfer energy to a useful output, such as a shaft used to drive an electrical generator, a wheel, or other mechanical or electromechanical device.

There exist several fundamental issues with the recovery of energy from a reciprocating piston driven by pressure-volume energy changes in a cylinder. To maximize the energy recovered by a change in pressure within the volume bounded by the cylinder and piston surfaces, leakage of the fluid under pressure past the interface between the piston outer surface and the adjacent cylinder inner surface must be minimized, which dictates a tight seal, yet friction (and wear) caused by physical contact of the piston with the cylinder must also be minimized, which dictates little or no contact between moving parts. The same paradigm is present where the converse situation is present, where energy is being transferred from a mechanical apparatus into a fluid, such as where a fluid is being compressed by reducing its volume within a piston-cylinder system. In either situation, loss of fluid under pressure through the interface, as well as friction at the interface, reduces the energy recovered from or put into the fluid, and hence the efficiency of the device.

One known mechanism for sealing a piston-cylinder interface is to employ a split ring, also known as a Ramsbottom seal, in a groove in the piston wall such that the seal moves with the piston and seals across the piston-cylinder interface. The seal is commonly, for example, a square cut split metal ring, which is received within a mating square cut groove in the outer cylindrical surface of the piston, and the free diameter of the ring or seal is larger than the inner diameter of the cylinder, which ensures expansion or bias of the outer surface of the ring toward the inner circumferential wall of the cylinder. Oil or other lubricant is commonly, but not always, used to lubricate the contact area between the seal and the inner wall of the cylinder, which provides a mechanism to remove heat from the sliding interface and reduce friction where the outer face of the ring rides on a thin film of oil and not directly in contact with the cylinder wall. However, in applications where lubricants cannot or should not be used, for example, where a seal must be maintained across alternating low pressure and high pressure sides of a piston located in a cylinder used in a Stirling engine, the lack of lubrication contraindicates the use of a Ramsbottom or other contact-type seal, because of the high contact friction between the seal and cylinder wall, which leads to energy losses, and the high wear of the ring and/or the cylinder wall, which will require frequent replacement of one or both. These issues have limited the application of a simple Ramsbottom seal arrangement in such no- or low-lubricant applications.

One mechanism which has been used to provide a non-lubricated sliding seal is a clearance seal between the outer circumferential surface of the piston and inner circumferential surface of the cylinder within which the piston reciprocates. A clearance seal is formed by an intended, minute radial gap between the outer circumferential wall of the piston and adjacent interior cylinder wall surfaces. In theory, the piston may reciprocate in the cylinder on a hydrodynamic gas bearing formed by the very thin cushion of a gas or fluid which may be created between the outer circumferential wall of the piston and the inner circumferential wall of the cylinder by their relative motion. In practice, however, such a bearing is formed by supplying the gap with pressurized gas, making the bearing a hydrostatic bearing, requiring a supply of this pressurized gas. If it is desired that the piston not contact the cylinder, but not incur the expense of the hydrostatic gas bearing and associated components to provide pressurization, exacting alignment of the piston with respect to the cylinder is required of the mechanism that provides or receives mechanical energy to or from the piston respectively, to cantilever the piston off of this mechanism into the cylinder so that the piston moves within the cylinder without touching the cylinder wall. Because the clearance seal provides a leakage path between a high and low pressure side of the piston, an inherent energy and efficiency loss is present, exacerbated by the energy consumed to pressurize a hydrostatic gas bearing if used, but is tolerated as an acceptable trade off to enable non-lubricated sealing of the piston-cylinder interface.

SUMMARY OF THE INVENTION

The present invention provides a non-lubricated sliding seal wherein a seal member is received within a seal groove in one of a first or a second member, and the first member moves with respect to the second member. The seal ring has a height, a free outer diameter and a free inner diameter, and is received within a seal groove extending inwardly of a surface of said first or second member, and faces a surface of the other of said first and second members. The first and second members abut each other for sliding motion relative to one another, wherein a difference in pressure of a fluid spans the interface therebetween, a clearance gap exists between the first and second members, and fluid at the higher pressure may enter the clearance gap therebetween. The seal groove has a height larger than that of the seal ring, and a circumference such that, during relative sliding movement of the first and second members, the seal ring may move in either direction in which the relative sliding motion occurs, but usually opposed to the direction from which the higher pressure is present. The circumferential base of the seal groove is sized to ensure a gap between the seal ring and the circumferential base of the seal groove, such that the higher pressure may communicate through the clearance therebetween and into the seal groove, and thereby be maintained between the seal ring and the base of the seal groove, to bias the face of the seal ring opposite to the base of the seal groove into sealing engagement with the adjacent facing surface of the other of the first and second members. Thus, the sliding seal interface provided provides a substantial seal across the first and second members from the high to the low pressure sides thereof without the requirement of a lubricant, and without the limitations of a clearance seal. Additionally, the seal lands which form the opposed sides of the seal groove may be a material different from that of the seal ring. Likewise, the seal ring and the member within which the seal groove is located may comprise a first material, and the member within or over which the first member moves and the seal lands may comprise a second material.

In one aspect, the first member is a piston and the second member is a cylinder, within which the piston slidingly moves and may reciprocate therein as pressure is alternatively increased on either side thereof, and the seal groove extends into the outer wall of the piston. The groove has opposed lands spaced a height or gap therebetween, and a base having a first diameter. The seal ring has a height smaller than the height or gap of the seal groove, and, in a free state, i.e., where the ring is not acted upon by any forces, the seal ring has an outer diameter greater than the inner diameter of the cylinder and an inner diameter greater than the diameter of the base of the seal groove.

In an additional aspect, the second member is received within the first member, the first member includes an aperture therein though which the second member may slidingly move and reciprocate, and the seal groove is received within the aperture in the first member and extends into the circumferential wall of the aperture. The seal groove again has a height which is greater than that of the seal ring, but the inner diameter of the seal ring in its free state is less than the outer diameter of the second member, and the outer diameter of the seal ring in its free state is less than the diameter of the base of the seal groove, to ensure that the higher pressure, which alternates between the opposed sides of the second member, may be present in the space between the base of the seal groove and the outer diameter of the seal ring.

In a method of sealing a sliding interface, a seal groove is provided in a wall of a first member, which wall is located adjacent to, and moves with respect to, the wall of a second member, in the presence of a pressure difference between opposed sides of one of said first and second members, and the seal groove has a height greater than that of a seal ring received therein, and the higher pressure fluid causes the seal ring received in the seal groove to move from the high pressure side of the seal groove to the low pressure side of the seal groove under the influence of the alternating pressure. Additionally, the method may include sizing the seal ring to ensure there is a gap between the seal ring and the base of the seal groove, and influencing the seal ring, under the influence of the alternating pressure, to move in a direction opposed to the base of the seal groove toward the second member and make contact with it.

In additional aspects, the seal ring, and the first or second member within which the seal groove extends, may be made from a first material, and the opposed faces or lands of the seal groove, and the member (first or second) which does not include the seal groove therein, may be made of a second material. Additionally the seal ring groove may be provided in an assembly locatable over, and removable from, an end of one of the first or second members, to ease the assembly and replacement thereof.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF THE EMBODIMENTS

The present invention is an assembly for sealing the sliding interface between two members, for example, between a piston and a cylinder, in which the piston must bear a difference in pressure of a fluid across its faces and at the same time move by sliding relative to and generally parallel to and along the axis of the cylinder. It is understood that the present invention may likewise be used where the assembly seals the sliding interface between a rod and a bushing, wherein the rod moves by sliding relative to and along the axis of the bushing, or other applications where a sliding sealing interface is employed and wherein a degree of pressure isolation across the interface need be maintained. Although some features of this invention would be beneficial in applications using a liquid lubricant, the invention is particularly beneficial in applications not using a liquid lubricant. The materials of the piston, cylinder, and sealing system must therefore be chosen additionally for their ability to provide self-lubrication as they slide past or over each other, but which materials may have the limitation that, to provide low friction and a low wear rate, those materials sliding past or over each other be different from each other. Such applications include oil-less gas compressors, gas expanders, and low-temperature Stirling cycle engines and heat pumps, where features such as low temperature, cleanliness, inert fluid environment, and lack of combustion byproducts favorably promote low friction and a low wear rate of such self-lubricating materials.

Figure 1:
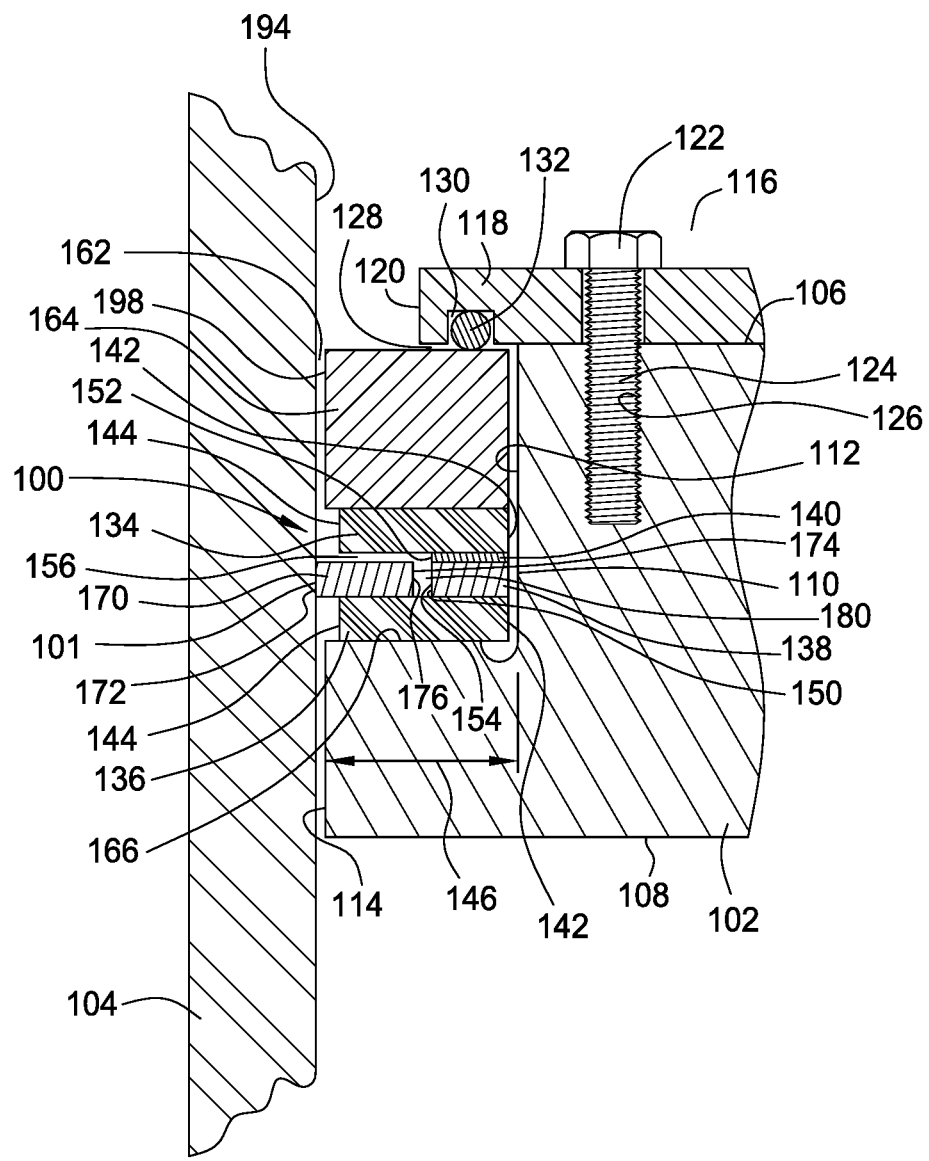
FIG. 1 shows a sealed sliding assembly of the present invention comprising an assembly for sealing the sliding interface between a piston and a cylinder.
Figure 1A:
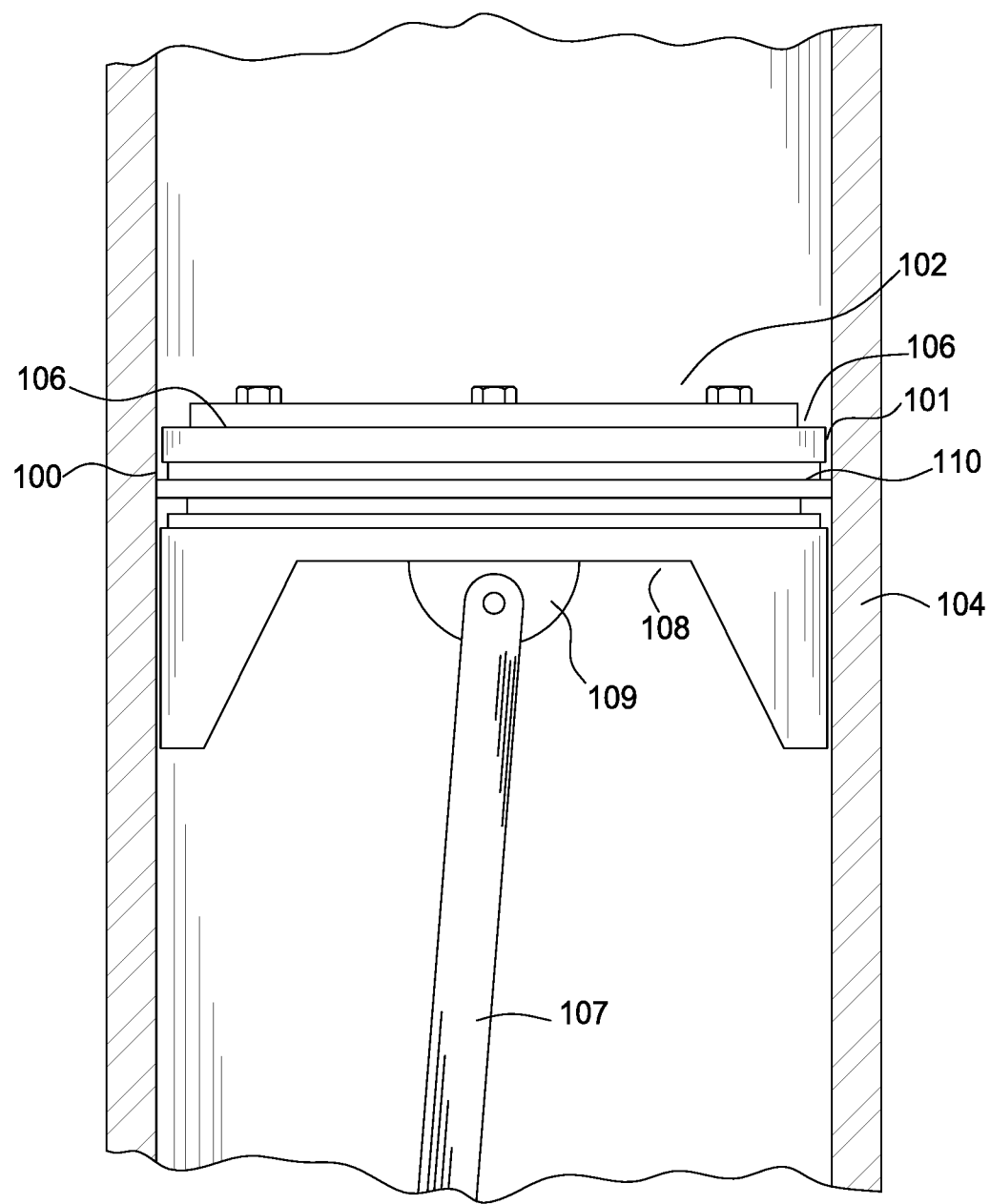
FIG. 1A is a schematic plan view, partially in cutaway, of a piston having the sliding seal assembly of FIG. 1 received in a cylinder.

FIGS. 1 and 1A show a preferred embodiment of a sealed sliding assembly 100 of the present invention useful for sealing a sliding interface 101, wherein a sliding interface 101 between a piston 102 (shown partially, in cutaway in FIG. 1 and fully in plan view of the piston and cutaway view of the cylinder in FIG. 1A) exists between a piston 102 which reciprocates in a cylinder 104 and provides a seal between opposed upper and lower sides 106, 108 of the piston 102. (In FIG. 1A a skirt assembly is also shown) A sealing sliding assembly 100 is shown integrally assembled into a piston 102, which, in this embodiment, reciprocates within a cylinder 104. The piston 102 and cylinder 104 are, as shown in FIG. 1A, configured to enable reciprocal motion of the piston 102 within the cylinder 104, to thereby impart motion to a connecting rod 107 where a difference in pressure is maintained on opposed sides of the piston 102, or to enable movement of the piston 102 within the cylinder 104 in response to motion imparted to the piston 102 by the connecting rod 107.

Piston 102 includes, at least at one end 108 thereof, the connecting rod 107, which may be pivotably attached at one end thereof to a boss 109 generally centered at one end or face 108 of the piston 102, and at another end thereof, to a driven component (not shown), such as a crankshaft, camshaft, or other arrangement. The connecting rod 107 may also be rigidly attached at one end thereof to the piston 102, likewise generally centered at one end or face 108 of the piston 102, and at the other end thereof, to a crosshead (not shown), which is further connected by another connecting rod to a driven component, such as a crankshaft, camshaft, or other arrangement. The sealed sliding assembly 100 is, in this embodiment, removably attached adjacent the other face or end 106 of piston 102, such that the sliding seal assembly 100 may be readily removed and replaced if servicing or replacement thereof is needed without removal of the piston 102 from the cylinder.

Referring again to FIG. 1, sliding sealing assembly 100 generally includes a seal groove assembly 110, consisting of a clamp ring 164, lands 134 and 136, shim 140, sealing ring 170, and spacer 138, which is removably attached to end 106 of piston 102 at the perimeter thereof, for ease of replacement if needed. The sliding seal assembly 100 is shown in partial cutaway, revealing the internal structure thereof. Sliding seal assembly 100 generally includes the seal groove assembly 110, which is positioned into a circumferential notch 112 extending inwardly of the end 106 of piston 102 about the outer circumference 114 thereof, which assembly is held in place within the notch 112 by a cap assembly 116.

Figure 2:
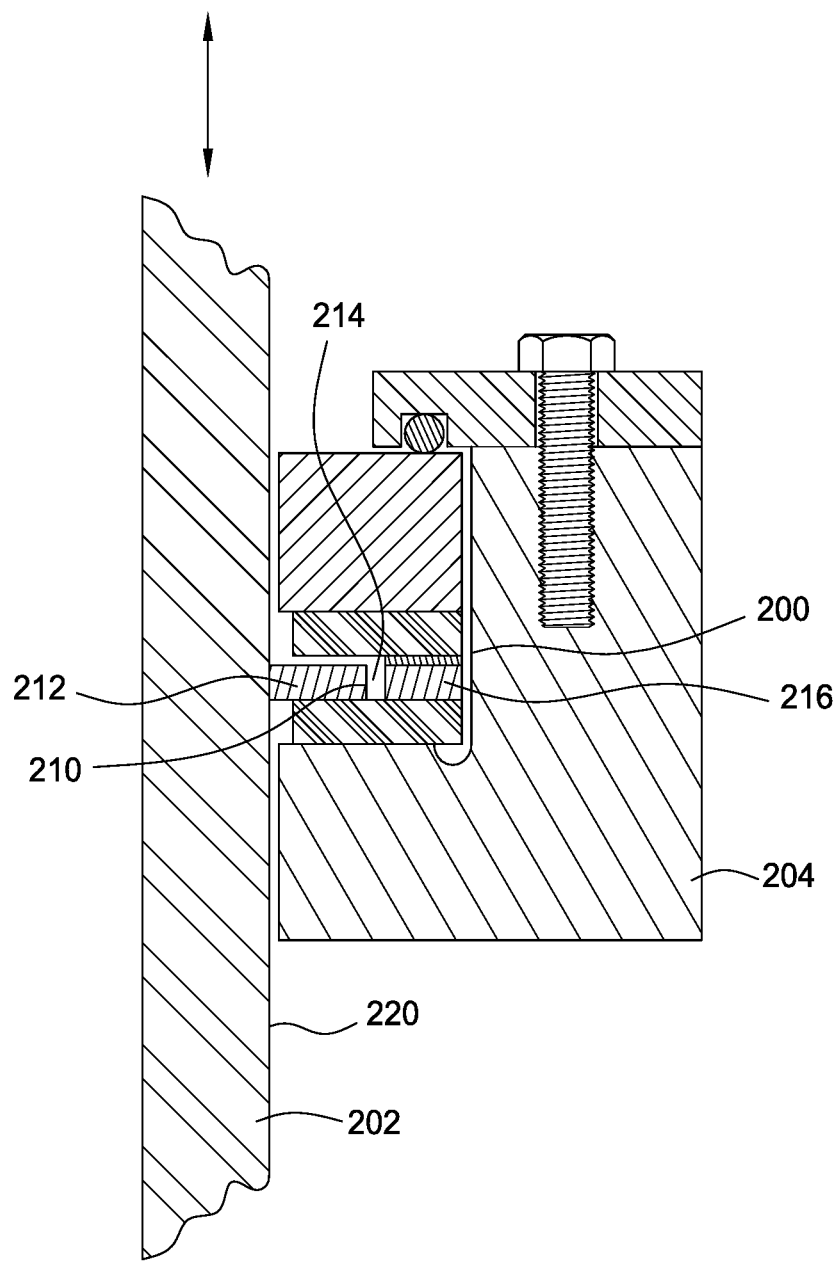
FIG. 2 shows an alternate embodiment of the present invention comprising an assembly for sealing the sliding interface between a rod and a bushing.
Figure 4:
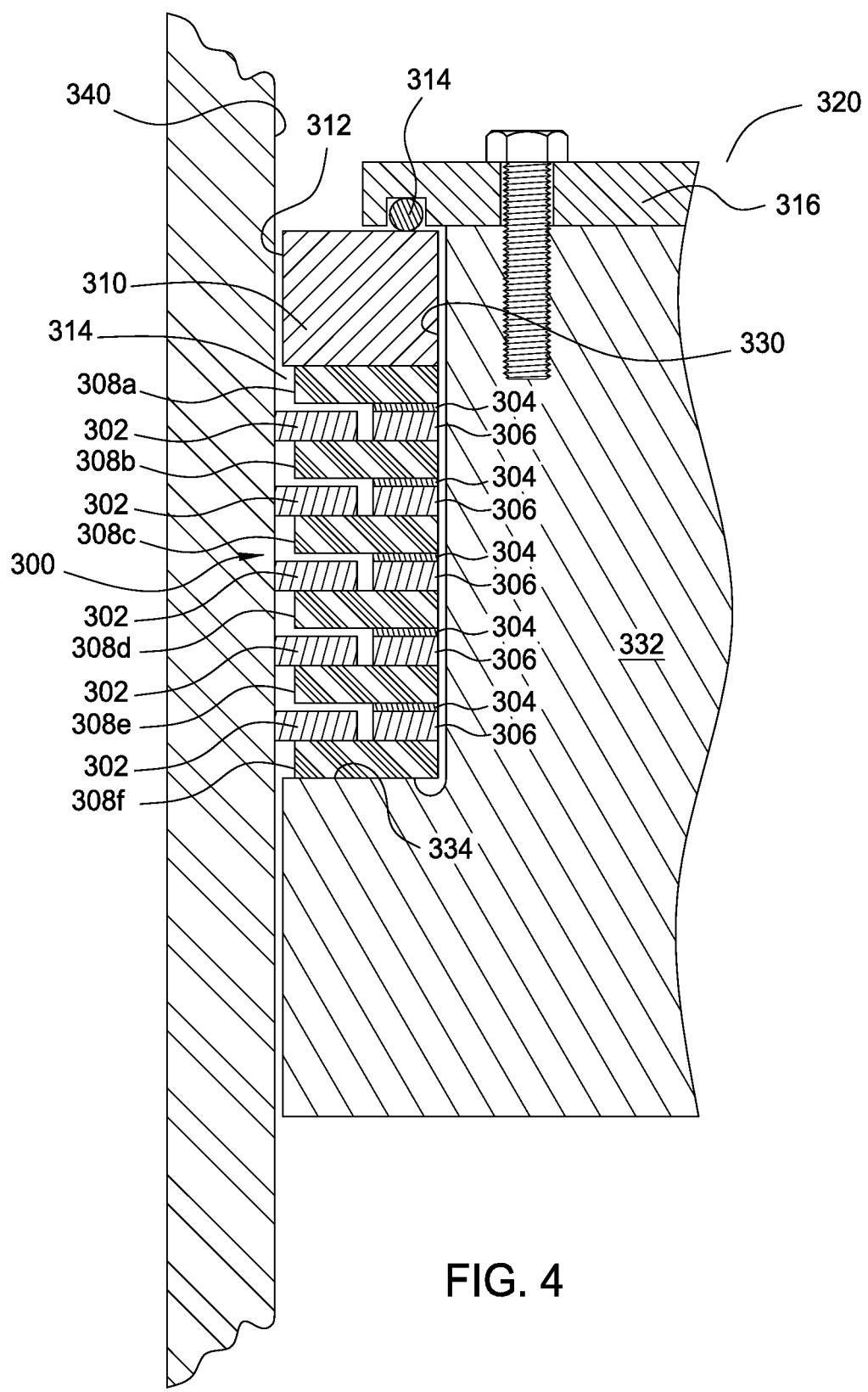
FIG. 4 shows another embodiment of the present invention, wherein the individual sealing assembly of FIGS. 1 and 2 is replaced with a ring pack.

Cap assembly 116 includes a cap 118, which may be configured as a circular or annular plate shaped member, having an outer circumference 120 which is smaller than the outer circumference 114 of the piston 102, yet is positioned to overhang notch 112. Cap 118 is maintained on the end 106 of piston 102 by a plurality (only one shown) of fasteners 122, in the case of FIG. 1, a plurality of threaded bolts 124 received within threaded bores 126 extending inwardly of end 106 of piston 102. Cap 118 includes an overhanging portion, 128, into which extends a circumferential positioning groove 130 facing the end 106 of piston 102. A compliant element 132, such as an o-ring, is received and retained within groove 130 and contacts seal groove assembly 110 to retain it in position on piston 102 within notch 112. Cap 118 is configured, sized and positioned, with respect to end 106 of piston 102 and notch 112 to prevent release of the seal groove assembly 110 from piston 102. It should be understood that although cap 118 is shown in FIG. 1 as including only one fastener 122 therewith, FIGS. 1A, 2 and 4 show the apparatus in partial cutaway, and the piston 102 and cap 118 extend as symmetrical cylindrical members, with the cap 118 affixed to the piston 102 by a plurality of evenly spaced fasteners 122, typically four or more fasteners evenly spaced about a bolt circle.

Referring still to FIG. 1, seal groove assembly 110 includes a pair of opposed first and second lands 134, 136, which are spaced from one another by a spacer 138 and a shim 140. Each of the lands has a radial expanse, as measured from an inner 142 to an outer 144 face thereof, which is slightly less than the depth 146 of the notch 112 in piston 102. The diameter prescribing the inner faces 142 of each of the lands 134, 136, is sized to be slightly larger than the outer diameter of the notch 112 within the piston 102, such that the lands 134, 136, may be placed over the piston 102 end 106 and into notch 112 without interference therewith. Spacer 138 and shim 140, in the embodiment shown, each have an inner diameter approximately equal to that of lands 134, 136, but a shorter expanse in the radial direction, such that the outer face 150 of spacer 138 and the outer face 152 of shim 140 form the base 154 of a seal ring groove 156, and in combination with the facing surfaces of the lands 134, 136, define the generally rectangular seal ring groove.

To maintain the seal groove assembly 110 in position within notch 112, a clamp ring 164 is positioned within the notch 112 and extends substantially from first land 134 to the end 106 of piston 102, where the complaint element 132 bears against the clamp ring 164 to bias the clamp ring 164 in the direction of the ledge 166 forming a base of the notch 112, such that the spacer 138 and shim 140 are pressed together between lands 134, 136, as shown in FIG. 1. The elasticity of the compliant element 132 maintains the clamp ring 164 in a biased state against the upper land 134 during thermal cycling of the piston 102, to maintain the integrity of the seal ring groove 156. The force need not be any greater than that necessary to prevent the parts of the assembly forming the seal ring groove 156 from separating from one another when the fluid pressure is maximally greater on the face 108 of the piston 102 opposite the cap 118, or when the force necessary to accelerate the mass of the clamped components in the downward direction of the drawing is approaching or at maximum. If the temperature of the fluid, which it is assumed the components will substantially attain during use, is within a range sufficient for an elastic polymer to retain its strength and elasticity, the compliant element 132 may be made of such a polymer. The compliant element 132 may also be made of metal, in the form of, for example, a garter spring.

The sliding seal assembly includes a sealing ring 170 positioned within the seal ring groove 156, which must slide over the inside surface of the cylinder 104 as the piston 102 reciprocates lengthwise within the cylinder 104, and also be capable of moving both radially and axially within the seal ring groove 156. Sealing ring 170 is in this embodiment a split ring, having an outer diameter 172, which in the free state (not in contact with any other components) is larger than the inner diameter of the cylinder 104, an inner diameter 174, which in the free state is larger than the outer diameter of the shim 140 and spacer 138, and a height 176 that is smaller than the height of the seal ring groove 156, enabling relative motion of the sealing ring 170 within seal groove 156 between the opposed lands 134, 136. Thus, when the fluid pressure is higher on one end 106 of the piston 102 as compared to the other end 108 thereof, that pressure communicates through a gap 162 which exists between the outer wall 198 of clamp ring 164 and inner wall 194 of the cylinder 104, to load the sealing ring 170 against the groove-facing surface of the land 136 on the side of the seal ring groove 156 opposite from that pressure. Additionally, when the fluid pressure becomes higher on the opposite end 108 of the piston 102, i.e., the pressure transitions so that the pressures on both piston 102 sides 106, 108 are equal and then the pressure on side 108 exceeds that on side 106, fluid pressure on the sealing ring 170 will likewise change, causing the sealing ring 170 to physically move between lands from contact with second land 136 when pressure is higher on side 106 to contact with first land 134 when pressure is higher on side 108. As the sealing ring 170 moves between the lands 134, 136, a small gap between the sealing ring 170 and the land 134 or 136 with which it was in contact opens, thereby allowing the volume or space between the inside diameter of the sealing ring 170 and the outside diameter of the spacer 138 to always be filled with fluid at the higher pressure. Where the sealing ring 170 is a split ring (Ramsbottom) or a segmented ring, this higher pressure also pushes the sealing ring 170 radially outward, so that it substantially contacts the inside diameter surface 194 of the cylinder 104. The force of this contact is substantially proportional to the difference in pressure between the two piston ends 106 and 108. Thus, the pressure loading of the sealing ring 170 against the interior wall 194 of the cylinder 104 is reduced whenever this pressure difference is reduced, resulting in less wear of the sealing ring 120 and energy loss to friction-generated heat.

The sealing ring may be made of self-lubricating materials such as graphite or carbon-graphite, possibly filled with PTFE, phenolic, polypropylene, or molybdenum disulfide, or of a polymer such as PTFE, polyimide, phenolic, or polypropylene, possibly filled with graphite, molybdenum disulfide, or PTFE particles. Self-lubricating proprietary materials, such as FibereComp™, a carbon fiber composite bearing material, may also be used. If the piston 102 is guided by the cylinder and thus is expected to make sliding contact with the cylinder, the piston 102 and clamp ring may also be made of such self-lubricating materials. In this case, because the sealing ring 170, clamp ring 164, and the piston 102 may all make sliding contact with the cylinder 104, they may be made of similar or perhaps identical materials that may be necessarily different from the material of the cylinder 104 so as to produce low friction and wear when sliding over the cylinder 104. Because the sealing ring 170 may nonetheless not produce low enough friction and wear if in direct contact with and when sliding over the clamp ring 164 and piston 102, however, there is provided that the components of first and second lands 134, 136, may be made out of a material different from the material of the sealing ring 170 that promotes low friction and wear as the sealing ring slides radially inwardly and outwardly of the seal ring groove 156 formed therebetween. The lands 134, 136 may be made of a material similar or perhaps identical to that of the cylinder 104. For example, in one embodiment, the seal ring 170, clamp ring 164, and piston 102 may be made from graphite and the cylinder 104 and lands 134, 136 from glass. Thus, each sliding interface, including the sealing ring 170 against the lands 134 or 136 and against the cylinder wall 194, and the piston 102 and clamp ring 164 against the cylinder wall 194 if the piston 102 makes contact with the cylinder wall 194, is composed of a glass-to-graphite contact. By providing lands 134, 136 and cylinder 104 of a first material, such as a glass, and the sealing ring 170, piston 102, and clamp ring 164 of a second material, such as graphite, the sliding interfaces between the sealing ring 170 and lands 134, 136, that between the sealing ring 170 and the cylinder wall 194, that between the piston 102 and the cylinder wall 194, and that between the clamp ring 164 and the cylinder wall 194 will have the same frictional characteristics. It has been found that this arrangement results in a substantial increase in efficiency of the piston 102-cylinder 104 system when used in a Stirling engine application as compared to traditional sealing arrangements, such as clearance seals. If the sealing ring 170 produces low enough friction and wear if in direct contact with and when sliding over the clamp ring 164 and piston 102, however, the lands 134, 136 may not be necessary, and may be omitted from the seal groove assembly 110. Additionally, the surfaces of the cylinder wall 194 and the lands 134, 136 in contact with the sealing ring 170 may have a common coating, or the sealing ring 170 surfaces in contact with the lands 134, 136 and the cylinder 104, as well as the surfaces of the piston 102 and clamp ring 164 in proximity to the cylinder wall 194 may have a common coating, such that the materials of these elements may be structurally optimized for the application, but coated to obtain desired sliding properties with respect to one another.

For simplicity, and as a potential cost-saving measure in lower volume production, the thickness of the spacer 138 may be made equal to the thickness of the sealing ring 170 by making both thicknesses at the same time and in the same manufacturing setup, and the clearance between the lands 134, 136 and sealing ring 170 established by installing the shim 140, which is a thin spacer having the same inside and outside diameters as the spacer 138 but made of shim material whose thickness is equal to the desired clearance, between one of the lands 134, 136 and the spacer 138. The shim material may be a polymer film, such as polyimide, capable of withstanding the temperature of service, and the shim 140 may be inexpensively cut or die-cut from this film. Alternatively, in higher-volume production, the thickness of the spacer 138 may be made greater than the thickness of the sealing ring 170 by an amount substantially equal to the desired clearance between the lands 134, 136 and the sealing ring 170, and the shim 140 not used.

The width and thickness of a split ring (Ramsbottom) or a segmented ring are calculated from consideration of the tolerances of manufacture, fluid pressures, frictional characteristics of the sliding surfaces, and accelerations, so that: a) The sealing ring 170 remains in contact with the land 134 or 136 opposite the side of the sealing ring 170 facing the higher pressure, or, if the pressure reverses, does not lift off the land it is in contact with and contact the other land until close to the time the pressure reverses; and b) the pressure in the volume 180 between the sealing ring 170 and spacer 138 will reliably push the sealing ring 170 outward to maintain substantial contact with the cylinder 104 around the sealing ring's 170 outer diameter, particularly wherever some portion of the side of the piston 102 is locally receding from the corresponding inside surface of the cylinder 104.

The outside diameter of either land 134, 136 is sized so that, under all extremes of the dimensional tolerances, this outside diameter does not contact the inside surface of the cylinder 104. If the piston 102 is expected to make contact with the cylinder 104, the clamp ring 164 is preferably made of the same material as the piston 102, so that the clamp ring 164 may also make sliding contact with the cylinder 104. This allows the outer diameter of the lands 134, 136 to be as large as possible, beneficially minimizing the distance the sealing ring 170 overhangs the outside diameter of either land 134, 136. As an additional cost-saving measure, the dimensions of the lands 134, 136 may be substantially identical, so that interchangeable parts may be used in more than one location.

As a further simplification and potential cost-saving measure, the clamp ring 164 may be eliminated and the compliant element 132 brought directly into contact with the first land 134, provided that the land 134 is sufficiently strong, or that the pressure on the face 108 of the piston 102 opposite the cap 118 is never significantly greater than the pressure on the cap 118, and, in either case, that the tolerances, misalignment or motion of the piston 102 or its components are such that the lands 134, 136 (and cap 118 if the cap is not of same material as the piston 102) do not contact the cylinder 104.

Alternatively, as a further cost-saving measure, the compliant element 132 may be eliminated, and the function it had performed be provided instead by the cap 118, if the cap is constructed with a sufficiently elastic material.

To assemble the sealed sliding assembly 100, land 136, and then spacer 138 and shim 140 are located onto the ledge 166 in notch 112, and the sealing ring 170 is assembled thereover. Land 134 and then clamp ring 164 are sequentially placed into notch 112, thereby forming the seal ring groove 156 with seal ring 170 therein. Clamp 118, with compliant element 132 therein, is secured over the end 106 of piston 102 to complete the assembly. The seal groove assembly 110 may be assembled onto the piston 102 with the piston separated from cylinder 104, in which case a Ramsbottom or a segmented type of seal ring 170 will have to be first radially compressed, if necessary with a piston ring compressor tool as used in internal combustion piston engine assembly, to permit insertion of the completed piston assembly into the cylinder 104, or while piston 102 is fully positioned within cylinder 104, in which case a Ramsbottom type seal ring 170 may be radially compressed merely by hand during insertion into the cylinder 104. Also, the assembly sequence and construct allows the seal ring 170 to be assembled without stretching the seal ring 170 over the outer diameter of the piston 102, and also allows the seal ring and entire seal groove assembly 110 to be replaced, if needed, without removing the piston 102 from the cylinder 104. Additionally, because the seal ring 170 need not be stretched over the outer circumference of the piston 102 (or, in FIG. 2, distorted to fit into the sealing groove), a solid, not split, ring may also be employed as the seal ring 170.

Figure 3:
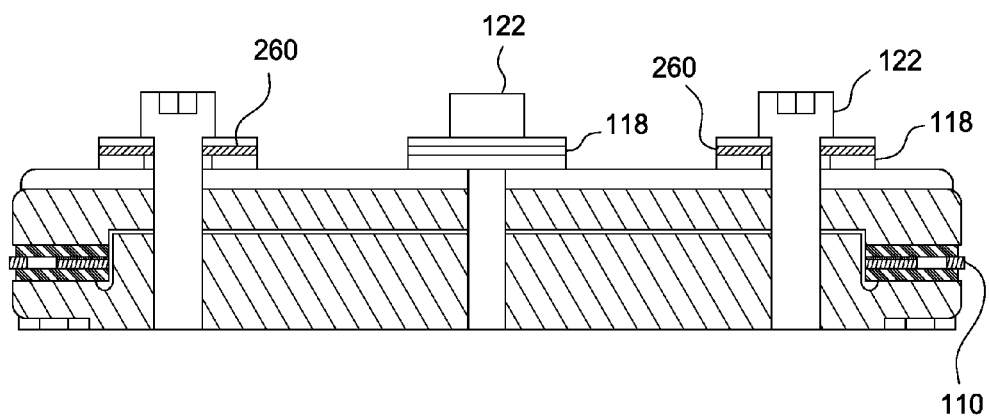
FIG. 3 shows another embodiment of the present invention comprising one or more springs used in place of the compliant element of FIGS. 1 and 2.

In yet another embodiment of the present invention, a combination of a compliant element and a cap having elastic properties may be used. In yet another embodiment, as shown in FIG. 3, the compliant element may be eliminated, and the function it had performed be provided by one or more springs 260, such as disk or Belleville springs located under the heads of the fasteners 122, so as to allow the cap 118 and seal groove assembly 110 to be clamped to the piston 102 by the force of the springs 260. A substantially controlled and circumferentially uniform amount of force is exerted, provided that the surfaces in contact are flat enough, while absorbing the accumulation of the dimensional tolerances in these components.

FIG. 2 shows an alternate embodiment of a sealed sliding assembly 200 of the present invention likewise useful for sealing a sliding interface between a rod and a bushing rather than between a piston and a cylinder. In this embodiment, the roles of the piston and cylinder in the first embodiment are reversed, with the inside surface of the cylinder becoming the outside surface of the rod 202, and the outside surface of the piston becoming the inside surface of the bushing 204. As with the sealed sliding assembly of FIG. 1, either the rod 202 or the bushing 204, or both, may be moving with respect to a stationary reference. All of the components function in the same way as those of the sealed sliding assembly 100, except that the higher pressure in the volume between the outside diameter 210 of the seal ring 212 and the inside diameter 214 of the spacer 216 causes the seal ring 212, if the seal ring 212 is a split ring (Ramsbottom) or a segmented ring, to be pushed radially inwardly (in the direction of the rod 202), so that it substantially contacts the outside diameter 220 of the rod 202.

Referring to FIG. 4, the sliding seal assembly of FIG. 1 may be modified to include a ring pack 300 formed from certain components of the seal groove assembly 100 of FIG. 1. In this embodiment, the notch 330 into the piston 332 of FIG. 3 is extended as compared to that of notch 112 of piston 102 of FIG. 1, and a ring pack 300 may be formed by assembling a stack of sealing rings 302, shims 304, and spacers 306 individually alternating with lands 308 a-f into the notch 330, and the assembly is held against the ledge 334 of the notch 330 adjacent the end of the piston 332 with a single clamp ring 310 having an outside diameter 312 slightly greater than the outside diameters 314 of the lands 308 and installed between the uppermost land 308a and a compliant element 314 held by a cap 316 removably fastened to one end 320 of the piston 332, so as to prevent the outside diameters of the lands 308 from contacting the cylinder. This ring pack 300 requires lands 308 that are strong enough to withstand the force resulting from the worst-case division of the fluid pressure across the piston and the force resulting from accelerating the mass of the clamped components. Again, as with the embodiments shown in FIG. 1, the seal rings 302 of this embodiment are intended to move through a gap within the seal groove created by the spacing between the opposed faces of adjacent lands 308 of each groove being larger than the thickness or height of the seal ring 302, and, if the seal ring 302 is of the Ramsbottom or segmented types, a gap between the seal ring 302 and the base of each seal groove may be accessed by the higher pressure fluid to increase the sealing force of the seal ring 302 against the cylinder wall 340. As with the alternate embodiment of the sealed sliding assembly 200 used for sealing a sliding interface between a rod and a bushing rather than between a piston and a cylinder, where the roles of the piston and cylinder are reversed, the ring pack embodiment may be applied to the sealed sliding assembly 200.

The embodiments of the invention shown and described herein provide many advantageous features. For example, the components in sliding contact are able to run without liquid lubrication. Use of a seal ring 170 as the sealing method allows a significantly shorter piston and cylinder for the same piston stroke length compared to a piston and cylinder sealed by a clearance seal, and the tolerances that are critical involve primarily flatness and parallelism, which may be achieved inexpensively as compared to the tight diameter and cylindricity tolerances necessary to produce a good a clearance seal. By clamping the components of the sliding seal assembly using a compliant member such as an o-ring, the clamping force on the elements may be well-controlled or limited to a low value, thus allowing these components to be made of fragile materials, such as glass or carbon-graphite, while at the same time allowing the fasteners 122 to be secured against loosening by any suitably robust means, independent of the amount of clamping force, including, if they are threaded fasteners, being tightened to a high torque or otherwise secured by a thread-locking means, and allowing the accumulation of the dimensional tolerances in these components to be absorbed while maintaining a consistent and predictable amount of clamping force.

The lands 134, 136, and 308 may be constructed from float glass (e.g. Schott's Borofloat), which inherently and inexpensively provides sufficient flatness, smoothness, and parallelism of the flat surfaces with minimal or without any further grinding, lapping, or polishing operations, and which is compatible with the materials used herein for the seal rings 170, 212, and 302. The inside and outside diameters of the float glass lands may be produced by precision abrasive waterjet cutting, which is a relatively inexpensive process for achieving sufficient dimensional accuracy. They may also be constructed of porcelain enamel coated metal, preferably a metal such as Kovar which is stronger and stiffer than glass and whose coefficient of thermal expansion is close to that of the porcelain enamel, which, if the flat surfaces are not flat enough, could be inexpensively Blanchard or double-disk ground to achieve the required flatness It is understood by those skilled in the art that certain components of the assemblies and subassemblies described herein may be omitted or interchanged within the sealed sliding assembly of the present invention.

We claim:

1. A sealing assembly configured for sealing of a sliding interface of a first member and a second member wherein said first member and said second member reciprocatingly move with respect to one another, said first member having an outer circumference of a first diameter and said second member having an inner circumference of a second diameter, said sealing assembly including:
a seal ring groove received on one of said first and second members, said seal ring groove including opposed first and second lands comprised of a material different from that of said first or second member within which it is located, said seal ring groove defining a circumferential base and a span of a distance L between said lands;
a seal ring received in said seal ring groove, said seal ring having a span smaller than L, a free outer diameter greater than said first diameter of said first member and an inner diameter greater than the diameter of said base of said seal ring groove where said seal ring groove is received within said first member, or a free inner diameter smaller than said second diameter of said second member and an outer diameter smaller than the diameter of said base of said seal ring groove where said seal ring groove is received within said second member, such that a gap may be maintained between said seal ring and said base of said seal ring groove within which said seal ring is located, wherein said seal ring is free to move between said first land and said second land in response to changes in the pressure on opposed sides of said seal ring; and
a shim disposed on a spacer, said shim and said spacer disposed between and defining the distance between said first and second lands, wherein said seal ring and said spacer each have opposed parallel flat surfaces and the distances between the opposed parallel flat surfaces of said spacer and said seal ring are the same, wherein said shim and said spacer are combined together as a single part.

2. The sealing assembly of claim 1, wherein said sealing assembly components are self lubricating.

3. The sealing assembly of claim 1, wherein said first member is a piston and said second member is a cylinder, and said piston reciprocates with respect to said cylinder.

4. The sealing assembly of claim 1, wherein said first member is a rod and said second member is a bushing, and said rod reciprocates with respect to said bushing.

5. The sealing assembly of claim 1, further including a clamp ring and one of said first and second lands in contact with one another, wherein said clamp ring provides support to maintain the position of said one of said first and second lands in said seal ring groove.

6. The sealing assembly of claim 1, wherein said one of said first and second members receiving said seal ring groove and said seal ring are comprised of the same materials.

7. The sealing assembly of claim 1, wherein fluid at the higher of the pressures acting upon opposed sides of said one of said first and second members receiving said seal ring groove is present in said gap formed between said seal ring and said base of said seal ring groove.

8. The sealing assembly of claim 1, wherein said seal ring is comprised of a first material, and said lands are comprised of a second material.

9. The sealing assembly of claim 8, wherein said first member and said second member are comprised of different materials.

10. A method of sealing a sliding interface between a first member and a second member, wherein said first member includes a seal ring groove therein on a surface abutting a surface of said second member, said seal ring groove having a base and having opposed lands comprised of a material different from that of said first member therein, said opposed lands separated by a span L, and a seal ring having a surface received within said seal ring groove, said surface facing and spaced from said base of said seal ring groove and having a span smaller than L, including the steps of:
providing a shim disposed on a spacer, said shim and said spacer disposed between and defining the span L between said opposed lands, and said seal ring and said spacer each having opposed parallel flat surfaces, wherein the distances between the opposed parallel flat surfaces of said spacer and said seal ring are the same, wherein said shim and said spacer are combined together as a single part;
applying a pressure on a first side of said first member that is greater than the pressure on a second side of said first member, the pressure on said first side of said first member causing said seal ring to move within said seal ring groove into engagement with the land of said seal ring groove closest to said second side of said first member;
experiencing a change in the relative fluid pressure on said first and second sides of said first member, such that the pressure on said second side of said first member becomes greater than that on said first side of said first member, and causing said seal ring to move within said seal ring groove into engagement with the land of said seal ring groove closest to said first side of said first member; and
wherein the seal ring may expand and contract radially, and whenever there is a difference in pressure between said first and second sides of said first member, establishing a fluid passage from the side of said first member having the higher pressure through a gap between said seal ring and said land nearer said side of said first member having said higher pressure, said gap being established when said seal ring moves between said lands away from said side of said first member having said higher pressure, to the region in said seal ring groove between said seal ring and said base of said seal ring groove, such that, as the pressure increases on said side of said first member having said higher pressure, an increased force is exerted by said seal ring against an adjacent surface of said second member.

11. The method of claim 10, further including the step of providing the seal ring into said seal ring groove, wherein said seal ring is a split ring style seal having a diameter in a free state such that said seal ring will be spaced from said base of said seal ring groove and naturally contact the adjacent surface of said second member.

12. The method of claim 10, wherein said first member is a piston and said second member is a cylinder.

13. The method of claim 10, wherein said first member is a bushing and said second member is a rod.

14. The method of claim 10, wherein said seal ring groove further includes a clamp ring and one of said lands in contact with each other, wherein said clamp ring provides support to said one of said lands.

15. The method of claim 10, wherein said seal ring and said lands are comprised of different materials.

16. The method of claim 10, wherein said first member and said second member are comprised of different materials.

* * * * *